United States Patent [19]

Urban et al.

[11] Patent Number: 5,614,015
[45] Date of Patent: Mar. 25, 1997

[54] PROCESS FOR THE PREPARATION OF 4,10-DIBROMOANTHANTHRONE PIGMENT

[75] Inventors: Manfred Urban, Wiesbaden; Gerhard Wilker, Mörfelden-Walldorf, both of Germany

[73] Assignee: Hoechst Aktiengesellschaft, Germany

[21] Appl. No.: 528,145

[22] Filed: Sep. 14, 1995

[30] Foreign Application Priority Data

Sep. 16, 1994 [DE] Germany .......................... 44 33 041.3
Mar. 23, 1995 [DE] Germany .......................... 195 10 668.7

[51] Int. Cl.$^6$ ........................................... C08K 5/00
[52] U.S. Cl. .................... 106/498; 106/493; 106/23 R
[58] Field of Search ................................ 106/493, 498, 106/23 R

[56] References Cited

U.S. PATENT DOCUMENTS

| | | | |
|---|---|---|---|
| 4,018,791 | 4/1977 | Spietschka et al. | 540/137 |
| 4,432,796 | 2/1984 | Santimauro | 100/19 F |
| 4,705,572 | 11/1987 | Spietschka et al. | 106/493 |
| 5,062,577 | 11/1991 | Schmitt et al. | 241/171 |
| 5,071,483 | 12/1991 | Dietz et al. | 106/498 |
| 5,229,515 | 7/1993 | Pfenninger et al. | 546/49 |
| 5,296,034 | 3/1994 | Dietz et al. | 106/493 |
| 5,318,627 | 6/1994 | Dietz et al. | 106/412 |

FOREIGN PATENT DOCUMENTS

| | | |
|---|---|---|
| 0075182 | 3/1983 | European Pat. Off. . |
| 0360184 | 1/1994 | European Pat. Off. . |
| 2540739 | 4/1976 | Germany . |
| 3716587 | 2/1993 | Germany . |
| 1463141 | 2/1977 | United Kingdom . |

OTHER PUBLICATIONS

*Fiat Final Report* 1313:88–90, vol. II (Feb. 1948).

*Primary Examiner*—Mark L. Bell
*Assistant Examiner*—Scott L. Hertzog
*Attorney, Agent, or Firm*—Connolly & Hutz

[57] ABSTRACT

A process for the preparation of 4,10-dibromoanthanthrone pigment, which comprises first subjecting the crude 4,10-dibromoanthanthrone pigment, which is in the coarsely crystalline state, to wet milling in an aqueous medium in a stirred ball mill which is operated at a power density of more than 2.5 kW per liter of milling space and at a peripheral stirrer speed of more than 12 m/s under the action of grinding media with a diameter of less than 1.0 mm, until the desired degree of fine division is reached (millbase suspension), and then isolating the resulting pigment in a conventional manner; or subjecting the prepigment obtained in the wet milling to a treatment at elevated temperature (finish) in an aqueous medium, an aqueous-organic medium or a liquid aromatic compound, and then isolating the pigment.

23 Claims, No Drawings

PROCESS FOR THE PREPARATION OF 4,10-DIBROMOANTHANTHRONE PIGMENT

The present invention relates to a particularly environment-friendly and economic process for the preparation of 4,10-dibromoanthanthrone pigment. Anthanthrone pigments are used for the pigmentation of high molecular weight materials and distinguished by their high transparency and tinctorial strength in all current coating systems.

Among the anthanthrone derivatives, 4,10-dibromoanthanthrone in particular has acquired great technical importance as a pigment. The preparation of the crude pigment is described in Fiat Final Report 1313 Vol. II. In this preparation, 8,8'-dicarboxy-1,1'-binaphthyl is cyclized in sulfuric acid monohydrate to give the anthanthrone, which is then brominated. The 4,10-dibromoanthanthrone thus obtained is precipitated as the oxonium sulfate by addition of small quantities of water, and is isolated. The crude 4,10-dibromoanthanthrone pigment is produced from this form by hydrolysis.

For conversion of the crude, coarsely crystalline pigments into the pigment form, a variety of methods of fine division have been disclosed:

GB-A-1 463 141 describes the fine division of the crude pigment by dissolution in concentrated acids and subsequent precipitation by pouring the solution into water. The fine division is followed by a treatment with cetyltrimethylammonium bromide. The pigments obtained in this way possess only moderate tinctorial strength. In addition, large quantities of dilute sulfuric acid are obtained which require regeneration.

EP-A-0 075 182 describes a method in which the fine division of the crude pigment is accomplished by treatment with polyphosphoric acid and subsequent hydrolysis, after which known finishing variants may be carried out. The pigments prepared by this method possess low tinctorial strength. The method is highly complex, since the large quantities of dilute phosphoric acid which are produced have to be reprocessed.

U.S. Pat. No. 4,705,572 describes a method in which the fine division of the crude pigment is carried out by revatting. The fine division is followed by a solvent finish. Although the pigments obtained are tinctorially strong, the quantities of salt produced in the course of revatting lead to wastewater problems. Owing to the high costs for chemicals, this method is uneconomic.

U.S. Pat. No. 4,018,791 describes the purification of the crude pigment by way of the sulfate and subsequent milling in a liquid medium. Tinctorially strong pigments are obtained if the crude pigments produced after the synthesis are converted into the sulfate using 25 times the quantity of concentrated sulfuric acid, this sulfate is isolated, the pure product is liberated from it by hydrolysis, and this product is separated off and milled in a liquid medium. Pigments of high transparency cannot be obtained by this procedure. The large quantities produced of about 70–80% strength sulfuric acid have to be regenerated. Moreover, extremely long milling times are required, and therefore the space-time yield achieved is low. For these reasons, this method is very expensive and uneconomic. The pigments obtained do not satisfy current requirements.

U.S. Pat. No. 5,071,483 describes the preparation of pigment formulations based on anthanthrone pigments, by aqueous bead-milling of the crude pigments in the presence of pigment dispersing agents. The milling is followed by a solvent finish. Owing to the use of pigment dispersing agents, the industrial application of these formulations in the coatings sector is very restricted, since they cannot be employed in modern solvent-free coating materials. In addition, pigments of high transparency cannot be repaired by this procedure.

The object of the present invention was to provide an environment-friendly and cost-effective process for the preparation of 4,10-dibromoanthanthrone pigment of high tinctorial strength and with a high degree of transparency which can be adjusted to the specification, or high opacity, which process, in addition, overcomes the disadvantages of the prior art.

Surprisingly it has been found that 4,10-dibromoanthanthrone pigment having outstanding color properties, high transparency and high tinctorial strength can be prepared by wet-milling the crude 4,10-dibromoanthanthrone pigment, obtained in coarsely crystalline form in the synthesis, in an aqueous medium on a stirred ball mill at high energy density and with small grinding media until the fine division of the resulting pigment particles reaches a defined, optimum degree, and working up the resulting millbase suspensions in a conventional manner, or subjecting these suspensions directly or, in the case of intermediate isolation, after they have been taken up in water again, to a conventional finishing treatment at elevated temperature. If a particularly opaque pigment is desired, the finishing treatment is preferably carried out in an aromatic solvent.

The present invention provides a process for the preparation of 4,10-dibromoanthanthrone pigment, which comprises first subjecting the crude 4,10-dibromoanthanthrone pigment, which is in the coarsely crystalline state, to wet milling in an aqueous medium in a stirred ball mill which is operated at a power density of more than 2.5 kW per liter of milling space and at a peripheral stirrer speed of more than 12 m/s under the action of grinding media with a diameter of less than 1.0 mm, until the desired degree of fine division is reached (millbase suspension), and then isolating the resulting pigment; or subjecting the prepigment obtained in the wet milling to a treatment at elevated temperature (finish) in an aqueous medium, an aqueous-organic medium or a liquid aromatic compound, and then isolating the pigment.

Depending on the nature and physical properties of the crude anthanthrone pigment employed and on the desired application, either ready-to-use pigment is obtained directly after the wet milling, or a finely divided prepigment is formed first of all, which must be subjected to a finishing treatment at elevated temperatures in order to convert it into a ready-to-use pigment form. The prepigment presented for the finish may be in the form of the millbase suspension obtained or, in the case of intermediate isolation, it may presented after having been taken up beforehand in water, in an aqueous-organic medium or in the liquid aromatic compound. The finish is usually carried out in aqueous medium or in aqueous-organic medium if a pigment of maximum transparency is required, and in the liquid aromatic compound if a pigment of maximum opacity is required. The pigment can be isolated in a conventional manner.

In the process claimed, fine division and finish are combined in an elegant manner.

For the preparation of this pigment according to the invention, a high milling action is required, which is achieved by the use of specific embodiments of the stirred ball mills. For milling to the required efficiency, examples of suitable stirred ball mills are those designed for batchwise and continuous operation, having a cylindrical or hollow-cylindrical milling chamber in horizontal or vertical construction, which can be operated at a specific power density of more than 2.5 kW per liter of milling space, their peripheral stirrer speed being more than 12 m/s. This constructional design gives assurance that the high milling energy is transmitted to the material to be milled. Mills suitable for this purpose are described, for example, in U.S. Pat. No. 5,062,577. If the milling intensity of the mill is too low, then the good properties according to the invention, in particular the high transparency and high tinctorial strength, are not achieved. The energy output of the stirrer per unit time is transmitted to the material to be milled as comminution energy and less frictional energy in the form of heat. In order to dissipate this large quantity of heat without problems, constructional measures must give assurance that the ratio of milling space to milling chamber surface (cooling area) is kept as small as possible. At high throughputs, milling is carried out in a circuit, and the heat is passed to the outside predominantly by way of the milled material. The grinding media used are balls of zirconium oxide, zirconium mixed oxide, aluminum oxide or quartz with a diameter of less than 1.0 mm; it is advantageous to use those having a diameter of from 0.2 to 0.9 mm, preferably from 0.3 to 0.5 mm.

When continuous stirred ball mills are used for the fine division, the grinding media are separated from the millbase preferably by centrifugal deposition, so that there is virtually no contact between the separation devices and the grinding media, thereby enabling blockages of these grinding media to be largely avoided. These stirred ball mills are operated with a high grinding charge. In the case of the continuous stirred ball mills, the milling chamber is almost completely filled with grinding media.

For the process according to the invention, it is preferred to employ the crude pigments obtained in the synthesis according to Fiat Final Report 1313 Vol. II, which have been prepared by hydrolysis of 4,10-dibromoanthanthrone oxonium sulfate.

In order to determine the appropriate milling conditions, preliminary experiments are required. For the physical state of the crude pigment it is the purity, crystal size and quality of crystals which are critical. In general, pure and highly crystalline crude pigments have to be milled for a longer time than crude pigments which contain impurities and whose crystal lattice is imperfect.

Milling is carried out in an aqueous medium, preferably in the alkaline or neutral pH range, in particular at a pH of 7 to 14.

The term crude, coarsely crystalline pigments refers to those having an average particle size of more than 5 µm.

The pigment concentration in the millbase depends on the rheology of the suspension. It should be less than or equal to 40% by weight, in general from 5 to 35% by weight and preferably between 10 and 20% by weight.

The duration of milling depends on the fineness requirements of the respective area of application. Consequently, the residence time of the millbase in the stirred ball mill is in general, depending on the degree of fineness required, between 5 and 60 minutes. It normally works out at a duration of from 5 to 45 minutes, preferably from 5 to 30 minutes.

Milling is carried out at temperatures in the range from 0° to 100° C., expediently at a temperature of between 10° and 60° C. and preferably at from 20° to 50° C.

In addition to the liquid phase and the crude pigment, the millbase may also contain additives such as, for example, cationic, anionic or nonionic surface-active agents and/or defoamers and other additives. The addition of these additives can be made before, during or after milling or after the finish, all at once or in a number of portions. The most appropriate point in time must be determined beforehand by guideline experiments.

If, after milling, finely divided pigments are already present in the millbase suspension, then the pigments are isolated directly. If, after milling, finely divided prepigments are present in the millbase suspension, then the prepigments are subjected, directly or following addition of the abovementioned additives, to the thermal treatment (finish).

The thermal treatment is, if desired, carried out in the presence of organic solvents, for example $C_1$–$C_8$-alkanols or alicyclic alcohols, for example methanol, ethanol, n- or isopropanol, n- or isobutanol, tert-butanol, pentanols, hexanols or cyclohexanols; $C_1$–$C_5$-dialkyl ketones or cyclic ketones, for example acetone, diethyl ketone, methyl isobutyl ketone, methyl ethyl ketone or cyclohexanone; ethers and glycol ethers, for example the monomethyl or monoethyl ether of ethylene glycol and propylene glycol, butylglycol, ethyldiglycol or methoxybutanol; aromatic hydrocarbons, for example toluene, xylenes, cumene or ethylbenzene, aromatic chlorinated hydrocarbons, for example chlorobenzene, o-dichlorobenzene, 1,2,4-trichlorobenzene or bromobenzene; substituted aromatic compounds, for example benzoic acid, nitrobenzene or phenol; aliphatic carboxamides, for example formamide or dimethylformamide; cyclic carboxamides, for example N-methylpyrrolidone; $C_1$–$C_4$-alkyl carboxylates, for example butyl formate, ethyl acetate or propyl propionate; carboxylic acid $C_1$–$C_4$-glycol esters, $C_1$–$C_4$-alkyl phthalates and $C_1$–$C_4$-alkyl benzoates, for example ethyl benzoate; heterocyclic bases, for example pyridine, morpholine or picoline, over a period of preferably from 1 to 6 hours at 40° to 180° C., preferably from 60° to 120° C., under normal or superatmospheric pressure. The quantity of solvent which may be added to the aqueous medium may vary within wide limits. Up to 5 times the quantity by weight of solvent, based on the weight of pigment, is advantageous.

However, if a transparent pigment form is required, then a purely aqueous finish is preferred. Preferably, the prepigment suspension obtained after milling is employed without intermediate isolation. Depending on the intended use, the prepigments obtained by the process according to the invention can be converted into a more opaque or more transparent form, which can be controlled by way of the concentration, temperature, pH and duration of treatment. If a pigment form of maximum opacity is desired, then it is particularly preferred to carry out a finishing treatment in one or more of the abovementioned aromatic hydrocarbons, aromatic chlorinated hydrocarbons or substituted aromatic compounds.

If a maximum depth of color, both for opaque and for transparent pigment forms, is desired, then it is particularly advantageous to follow wet milling by an oxidative aftertreatment with a peroxodisulfate. Suitable peroxodisulfates are sodium peroxodisulfate, potassium peroxodisulfate or ammonium peroxodisulfate, preferably in aqueous solution. The oxidative aftertreatment is advantageously carried out by heating the millbase suspension in the presence of peroxodisulfate at temperatures of from 50° to 120° C., preferably from 60° to 100° C., and at a pH of between 8 and 14. At temperatures above 100° C in particular, a pressure vessel is advantageous for the reaction.

The oxidative aftertreatment can be carried out before or following the finishing treatment. Before isolating the pigment, it is advantageous to adjust the pH of the millbase suspension to from 6 to 7 using a mineral acid, preferably with dilute sulfuric acid.

The preparation of the anthanthrone pigment by the process according to the invention has proved to be particularly economic and environment-friendly, since the fine division of the crude pigments by wet milling does not give rise to any air pollution from the development of dust. In addition, chemicals and solvents are used either not at all or in small quantities, and can then be reprocessed or completely regenerated again subsequently. Therefore, there are no disposal problems.

It was surprising and unforeseeable from the prior art that fine division of the crude, coarsely crystalline anthanthrone pigment can be carried out successfully by wet milling in a single milling operation and without pigment dispersing agents.

The pigment prepared in accordance with the invention is suitable for the pigmentation of high molecular weight natural or synthetic organic materials, such as, for example, cellulose ethers and cellulose esters, such as ethylcellulose, nitrocellulose, cellulose acetate, cellulose butyrate, natural resins or synthetic resins, such as resins formed by addition polymerization or condensation polymerization, examples being amino resins, especially urea- and melamine-formaldehyde resins, alkyd resins, acrylic resins, phenolic resins, polycarbonates, polyolefins such as polystyrene, polyvinyl chloride, polyethylene, polypropylene, polyacrylonitrile, polyacrylates, polyamides, polyurethanes or polyesters, rubber, casein, silicone and silicone resins, individually or in mixtures. In this context it is irrelevant whether the high molecular weight organic compounds mentioned are in the form of plastic masses, melts, spinning solutions, varnishes, coating materials or printing inks. Depending on the intended use, it may prove advantageous to employ the pigment to be used in accordance with the invention in extended form or in the form of preparations or dispersions. Based on the high molecular weight organic material to be pigmented, the pigment prepared in accordance with the invention is employed in a quantity of preferably from 0.1 to 10% by weight.

The pigment prepared by the process according to the invention is suitable for use in all common solvent-containing and solvent-free coating systems. It is particularly suitable for use in metallic paints, where high transparency and high fastness properties are valued. Following its incorporation, transparent, tinctorially strong, clean and glossy finishes are obtained having very good fastness to weathering.

To evaluate the properties in coating systems of the pigment prepared in accordance with the invention, a selection was made from among the large number of known systems of an alkyd-melamine resin varnish (AM) based on a medium-oil alkyd resin and on a butanol-etherified melamine resin, of a two-pack varnish based on an isocyanate-crosslinkable acrylic resin (ICA), of a polyester varnish based on cellulose acetobutyrate and on a melamine resin (PE), and of an aqueous varnish based on polyurethane (PUR).

The examples which follow make reference to these varnishes using the designations AM, ICA, PE or PUR varnish.

In the examples below, parts and percentages are by weight.

EXAMPLE 1

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, which are rinsed with water, the combined millbase suspensions are filtered with suction, and the solid product is washed with water and dried at 80° C., to give 9.67 parts of a pigment which, in the AM, ICA, PE and PUR varnishes, gives transparent and tinctorially strong coatings.

EXAMPLE 1a (Comparison example)

If the crude pigment employed above is milled under the milling conditions described in EP-A-0 360 184, Example 8, without the addition of the pigment dispersing agent, on a bead mill with disk stirrer, zirconium mixed oxide beads of diameter 0.6–1 mm and at a peripheral stirrer speed of 10.2 m/s (2800 rpm) for 120 minutes and is then worked up, the resulting pigment is distinctly more opaque and noticeably weaker tinctorially, in the AM varnish, than the pigment prepared in accordance with the invention. Owing to its inadequate transparency, this pigment is unsuitable for the production of metallic paints.

EXAMPLE 2

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 5 minutes. The millbase suspension is then screened to remove the grinding media, which are rinsed with water, the combined millbase suspensions are filtered with suction, and the solid product is washed with water and dried at 80° C., to give 9.76 parts of a pigment which, in the AM varnish, gives coatings which are distinctly more opaque than with the pigment prepared according to Example 1.

EXAMPLE 3

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 30 minutes. The millbase suspension is then screened to remove the grinding media, which are rinsed with water, the combined millbase suspensions are filtered with suction, and the solid product is washed with water and dried at 80° C., to give 9.70 parts of a pigment which, in the AM varnish, gives coatings which are distinctly more transparent than with the pigment prepared according to Example 1. The ash content in the pigment is 0.42%.

EXAMPLE 4

A suspension consisting of 84.7 parts of water, 0.3 part of 98% pure sodium hydroxide and 15 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, which are rinsed with water, the combined millbase suspensions are filtered with suction, and the solid product is washed with water and dried at 80° C., to give 14.7 parts of a pigment which, in the AM, ICA, PE and PUR varnishes, gives transparent and tinctorially strong coatings. The ash content in the pigment is 0.24%.

EXAMPLE 5

A suspension consisting of 89 parts of water, 1 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 523 parts of zirconium oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, which are rinsed with water, the combined millbase suspensions are filtered with suction, and the solid product is washed with water and dried at 80° C., to give 9.70 parts of a pigment which, in the AM varnish, gives transparent and tinctorially strong coatings.

EXAMPLE 6

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media.

To carry out the finish, 0.17 part of 98% pure sodium hydroxide is added to 50 parts of the above millbase suspension, and the mixture is heated to boiling and stirred at boiling temperature for 3 hours. After cooling to 60° C., the pigment is filtered off with suction, washed with water and dried at 80° C., to give 4.4 parts of a pigment which, in the AM, ICA, PE and PUR varnishes, gives transparent and tinctorially strong coatings.

EXAMPLE 7

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, and the solid product is filtered off and washed to neutrality.

To carry out the finish, 20.2 parts of the above filter residue are introduced into a solution of 89.8 parts of water and 0.65 part of 98% pure sodium hydroxide, and the mixture is stirred at 50°–60° C. for 3 hours. Then the pigment is filtered off with suction, washed with water and dried at 50° C., to give 9.9 parts of a pigment which, in the AM varnish, gives transparent and tinctorially strong coatings.

EXAMPLE 8

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, and the solid product is filtered off and washed to neutrality. To carry out the finish, 23 parts of the above filter residue are introduced into a solution of 74 parts of water and 0.63 parts of 98% pure sodium hydroxide, and the mixture is stirred at 100° C. for 3 hours. Then the pigment is filtered off with suction, washed with water and dried at 50° C., to give 9.8 parts of a pigment which, in the AM, ICA, PE and PUR varnishes, gives transparent and tinctorially strong coatings. The fastness to weathering is excellent.

EXAMPLE 9

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, and the solid product is filtered off and washed to neutrality. To carry out the finish, 20.2 parts of the above filter residue are introduced into a solution of 89.8 parts of water and 0.2 part of an alkylphenol polyglycol ether sulfate and 0.4 part of 98% pure formic acid and the mixture is stirred at boiling temperature for 3 hours. After cooling to 60° C., the pigment is filtered off with suction, washed with water and dried at 80° C., to give 9.8 parts of a pigment which, in the AM varnish, gives transparent and tinctorially strong coatings.

EXAMPLE 10

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 15 minutes. The millbase suspension is then screened to remove the grinding media, and the solid product is filtered off and washed to neutrality. To carry out the finish, 20.2 parts of the above filter residue are introduced into a 189.8 parts of water, and the mixture is adjusted to a pH of 4–5 with 0.2 parts of 5% strength hydrochloric acid, heated to 155° C. and stirred at 155° C. for 10 hours. After cooling to 60° C., the pigment is filtered off with suction, washed with water and dried at 80° C., to give 9.8 parts of a pigment which, in the AM varnish, gives opaque and tinctorially strong coatings.

EXAMPLE 11

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is metered into a stirred ball mill (manufacturer: Draiswerke GmbH, Mannheim) which is filled with 336 parts of zirconium mixed oxide beads of diameter 0.3–0.4 mm as grinding media, and milling is carried out at a peripheral stirrer speed of 15.6 m/s and a specific power density of 3.1 kW per liter of milling space at 25° C. for 5 minutes. The millbase suspension is then screened to remove the grinding media, and the solid product is filtered off and washed to neutrality.

To carry out the finish, 22 parts of the above filter residue are introduced into a solution of 44 parts of water and 0.63 part of 98% pure sodium hydroxide, 44 parts of n-butanol are added, and the mixture is heated to 90° C. and stirred at 90° C. for 3 hours. The n-butanol is then distilled off at up to 100° C. at the bridge. The mixture is then cooled to 60° C., and the pigment is filtered off with suction, washed with water and dried at 80° C., to give 9.5 parts of a pigment which, in the AM varnish, gives very opaque coatings.

EXAMPLE 12

A suspension consisting of 89.7 parts of water, 0.3 part of 98% pure sodium hydroxide and 10 parts of crude, coarsely crystalline 4,10-dibromoanthanthrone pigment (prepared in accordance with Fiat Final Report 1313 Vol. II) is milled in a stirred ball mill (manufacturer: Draiswerke GmbH, Mannheim) which is filled to 90% of its volume with zirconium mixed oxide beads of diameter 0.3–0.4 mm as grinding media at a peripheral stirrer speed of 15.6 m/s and a specific power density of 3.1 kW per liter of milling space at 25° C. for 120 minutes in circulation.

To carry out the finish, 100 parts of the above millbase suspension are placed in a stirred vessel and heated at from 90° to 95° C. A solution of 7.5 parts of sodium peroxodisulfate and 35 parts of water is then added, and stirring is carried out at 90° to 95° C. for 1 hour. Subsequently, 30 parts of xylene (isomer mixture) are added, the mixture is heated at boiling for 5 hours, and then the xylene is distilled off with steam at up to 100° C. at the bridge. After the mixture has cooled to 60° C., 55 parts of 10% strength sulfuric acid are added and the pH is adjusted to from 6.5 to 7. The mixture is stirred at 60° C. for 1 hour and then the pigment is filtered off with suction, washed free of sulfate and dried at 80° C., to give 9.95 parts of a pigment which, in the AM varnish, gives very opaque and deeply colored coatings.

If the sodium peroxodisulfate treatment is omitted, then the pigments obtained give coatings having a reduced depth of color.

We claim:

1. A process for the preparation of 4, 10-dibromoanthanthrone pigment, which comprises first subjecting the crude 4, 10-dibromoanthanthrone pigment, which is in the coarsely crystalline state, to wet milling in an aqueous medium in a stirred ball mill which is operated at a power density of more than 2.5 kW per liter of milling space and at a peripheral stirrer speed of more than 12 m/s under the action of grinding media with a diameter of less than 1.0 mm, until the desired degree of fine division is reached (millbase suspension), and then isolating the resulting pigment in a conventional manner; or subjecting the prepigment obtained in the wet milling to a treatment at elevated temperature (finish) in an aqueous medium, an aqueous-organic medium or a liquid aromatic compound, and then isolating the pigment.

2. The process as claimed in claim 1, wherein the pigment concentration in the millbase is less than or equal to 40% by weight.

3. The process as claimed in claim 1, wherein the pigment concentration in the millbase is from 5 to 35% by weight.

4. The process as claimed in claim 1, wherein the pigment concentration in the millbase is from 10 to 20% by weight.

5. The process as claimed in claim 1, wherein grinding media with a diameter of from 0.2 to 0.9 mm are employed.

6. The process as claimed in claim 1, wherein grinding media with a diameter of from 0.3 to 0.5 mm are employed.

7. The process as claimed in claim 1, wherein the wet milling is carried out at a pH in the neutral or alkaline range.

8. The process as claimed in claim 1, wherein the wet milling is carried out at a pH of from 7 to 14.

9. The process as claimed in claim 1, wherein the wet milling is carried out at a temperature of between 0° and 100° C.

10. The process as claimed in claim 1, wherein the wet milling is carried out at a temperature of between 10° and 60° C.

11. The process as claimed in claim 1, wherein the wet milling is carried out at a temperature of between 20° and 50° C.

12. The process as claimed in claim 1, wherein the finish is carried out at temperatures of from 40° to 180° C.

13. The process as claimed in claim 1, wherein the finish is carried out at temperatures of from 60° to 120° C.

14. The process as claimed in at claim 1, wherein the finish is carried out in water.

15. The process as claimed in claim 1, wherein the finish is carried out in an aromatic hydrocarbon, an aromatic chlorinated hydrocarbon or a substituted aromatic compound, or a mixture thereof.

16. The process as claimed in claim 1, wherein the finish is carried out in toluene, xylene, cumene, ethylbenzene or a mixture thereof.

17. The process as claimed in claim 1, wherein the wet milling is followed by an oxidative aftertreatment with a peroxodisulfate.

18. The process as claimed in claim 17, wherein the peroxodisulfate is sodium peroxodisulfate, potassium peroxodisulfate or ammonium peroxodisulfate.

19. The process as claimed in claim 17, wherein the oxidative aftertreatment is carried out at temperatures of from 50° to 120° C.

20. The process as claimed in claim 17, wherein the oxidative aftertreatment is carried out at temperatures of from 60° to 100° C.

21. A method of pigmenting a coating material, printing ink or plastic comprising the step of incorporating a 4,10-dibromoanthanthrone pigment prepared as claimed in claim 1 into said coating material, printing ink or plastic.

22. A process for the preparation of 4, 10-dibromoanthanthrone pigment in transparent pigment form, which comprises first subjecting the crude 4, 10-dibromoanthanthrone pigment, which is in the coarsely crystalline state, to wet milling in an aqueous medium in a stirred ball mill which is operated at a power density of more than 2.5 kW per liter of milling space and at a peripheral stirrer speed of more than 12 m/s under the action of grinding media with a diameter of less than 1.0 mm, until the desired degree of fine division is reached (millbase suspension), and then isolating the resulting pigment in a conventional manner; or subjecting the prepigment obtained in the wet milling to a treatment at elevated temperature (finish) in an aqueous medium, and then isolating the pigment.

23. A process for the preparation of 4, 10-dibromoanthanthrone pigment in opaque pigment form, which comprises first subjecting the crude 4, 10-dibromoanthanthrone pigment, which is in the coarsely crystalline state, to wet milling in an aqueous medium in a stirred ball mill which is operated at a power density of more than 2.5 kW per liter of milling space and at a peripheral stirrer speed of more than 12 m/s under the action of grinding media with a diameter of less than 1.0 mm, until the desired degree of fine division is reached (millbase suspension, and then subjecting the prepigment obtained in the wet milling to a treatment at elevated temperature (finish) in an aqueous-organic medium or a liquid aromatic compound or in aqueous-organic medium at a temperature of up to 155° C., and then isolating the pigment.

* * * * *